United States Patent Office 3,644,299
Patented Feb. 22, 1972

3,644,299
FIBER-FORMING POLYAMIDES HAVING AN INCREASED CONTENT OF AMINO GROUPS
Walter Fester, Konigstein, Taunus, Ernst Hanschke, Burghausen (Salzach), and Franz Jakob, Hofheim, Taunus, Germany, assignors to Farbwerke Hoechst Aktiengesellschaft vormals Meister Lucius & Bruning, Frankfurt am Main, Germany
No Drawing. Filed Mar. 21, 1969, Ser. No. 809,400
Claims priority, application Germany, Mar. 26, 1968, P 17 70 057.1
Int. Cl. C08g 20/20
U.S. Cl. 260—78 TF
6 Claims

ABSTRACT OF THE DISCLOSURE

Polyamides having an especially high dye affinity with respect to basic dyestuffs are obtained by adding certain amounts of a polyamine.

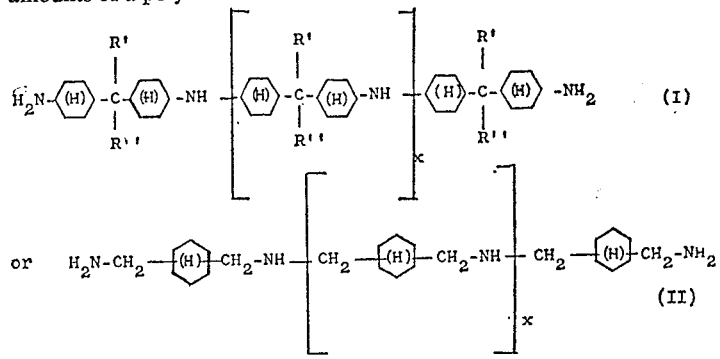

or a mixture of these polyamines, in which formulae $x$ represents zero or a whole number from 1 to 30, preferably zero or a whole number from 1 to 10, $R_2$ represents H, —$CH_3$, —$C_2H_5$, R" represents H, —$CH_3$, —$C_2H_5$, and the bonds of the rings in Formula II preferably being meta- and para-bonds, to the polyamide-forming starting material or subsequently to the polyamide. From the modified polyamides fibers are obtained which have an improved dye affinity with respect to basic dyestuffs.

---

The present invention relates to fiber-forming polyamides having an increased content of amino groups and to a process for their manufacture.

Polyamides derived from amino carboxylic acids, the derivatives thereof, for example lactams, such as ε-caprolactam, or diamines and dicarboxylic acids, such, for example, as polyhexamethylene diammonium adipate, possess, in addition to acid terminal group, also basic terminal groups, the latter being substantially amino groups.

When polyamides of this type are worked up into fibers, these amino groups are decisive for the dye receptivity of the fibers.

When fibers of this type are to be dyed with acid dyestuffs, it is desirable, therefore, that the polyamides should have as high a content of amino groups as possible. However, the number of the basic groups is limited due to the high molecular weight of the polyamides, since the terminal groups of the polycondensate consist of amino- and carboxyl groups. For example, a non-modified filament forming polycaprolactam contains, as a rule, of from 40 to 50 m Equiv. $NH_2$-groups/kg., depending on the manufacturing process and the molecular weight.

It has been described that the number of basic groups may be increased by the addition of amines such, for example, as hexamethylene diamine, diethylene triamine, polyethylene imine, xylylene diamine to the polycondensation batch or the polycondensate.

However, the degree of whiteness of these products does not fulfill the requirements for a fiber raw material. Especially with the use of amines with aromatic groupings as modifiers there are exclusively obtained discolored products. Moreover, when modifying the polyamides with the aforesaid amines, sufficiently high molecular weights of the corresponding polyamides cannot be obtained. An improvement of the degree of whiteness as well as an increase of the molecular weight in such a modifying process can be attained by the addition of phosphorus compounds such, for example, as phosphoric acid or the esters thereof. However, the addition of phosphoric acid is a disadvantage when $TiO_2$ is to be added to the polyamide for carrying out a matting process. The difficulties encountered arise from the fact that the phosphoric acid or the amine salt formed bring about coagulation of the $TiO_2$-suspension which is introduced in controlled amounts.

This coagulation may give rise to considerable difficulties during the spinning process.

Now we have found that a saturated aliphatic fiber-forming polycarbonamide having incorporated therein from 0.17 to 10% by weight, calculated on the weight of the aliphatic polycarbonamide, of a polyamine modifying agent having the formula

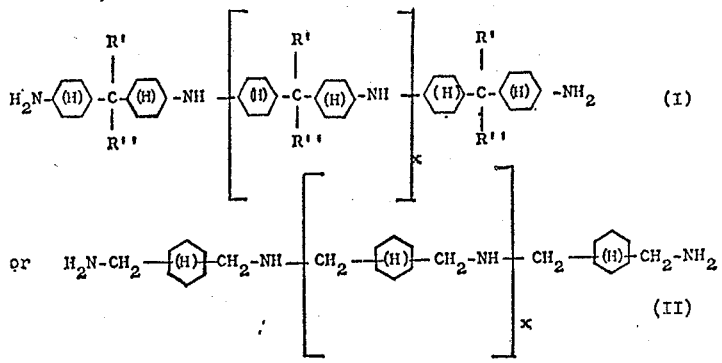

or a mixture thereof, wherein x represents an integer from zero to 10,

R' represents H, —CH₃, —C₂H₅

R" representing H, —CH₃, —C₂H₅

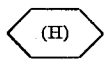

represents a completely hydrogenated benzene ring and wherein the bonds of the rings in the polyamine of Formula II are meta- or para-bonds, does not possess the aforesaid negative properties.

As conventional polyamide-forming starting materials there may be mentioned, for example, lactams, especially lactams having up to 13 ring atoms, such as ε-caprolactam and ω-lauryl-lactam; the corresponding ω-amino carboxylic acids such as, for example, ε-aminocaproic acid, 11-aminoundecanoic acid etc., the diammonium salts of alkylene diamines with aliphatic dicarboxylic acids, for example the respective salts of tetra-, hexa-, or octamethylene diamine with glutaric acid, adipic acid, pimelic acid, suberic acid, azelaic acid and sebacic acid. It is also possible to employ mixtures of the aforesaid starting materials. Preferred starting materials are ε-caprolactam and the corresponding ε-aminocaproic acid and hexamethylene diammoniumadipate; from which, according to the process of the present invention, there are obtained the filament-forming polycaprolactam and the filament forming polyhexamethylene diammonium adipate (modified polyamide 66).

The polyamine modifying agents are advantageously prepared in the following manner, for example:

When in Formula I, R' and R" each represents H, 4,4'-diaminodicyclohexylmethane is used as the starting substance. This substance is heated for a longer period of time (about 7 hours) at 250° C. in an atmosphere of nitrogen in the presence of 1% by weight of Raney nickel. The poly-4,4-diamino-dicyclohexylmethane formed is without exception a mixture of several substances of different polymerization degrees (especially x representing zero or a whole number from 1 to about 10). When R' and R" each represent a methyl- or an ethyl group, the homologs corresponding to 4,4'-diamino-dicyclohexylmethane are, of course, used as the starting substances. The reaction conditions remain essentially unaltered.

In the manufacture of polyamine II, xylylene diamine is used as the starting substance, para- and meta-xylylene diamine and mixtures of these xylylene diamines being preferred. Ortho-xylylene diamine is less suitable; however, minor amounts thereof in mixture with para- and/or meta-xylylene-diamine may likewise be used. The xylylene diamine or the mixture of the isomeric xylylene diamines is then heated in the presence of a nickel catalyst (for example "Typ CO" of Messrs. Degussa) at 220° C. over a period of 4 hours under a hydrogen pressure of from 100 to 200 atmospheres gage. Monomeric xylylene diamine hydrogenated in the nucleus is advantageously distilled off; the residue consists a mixture of different polyamines of Formula II having different degrees of polymerization, which may be used as such for the manufacture of modified polyamides according to the process of the present invention. The residue may also be subjected to a distillation whereby enriched or almost uniform compounds are obtained. For example, at a temperature of 150° to 200° C. and under 0.1 mm. Hg pressure, a fraction is obtained containing enriched dixylylene triamines which have been hydrogenated in the nucleus (in Formula II: x representing zero); very careful distillation also yielding the uniform compounds. When a non-uniform isomer of xylylene diamine is used as the starting substance, the bonds of the rings of final product II are non-uniform; they represent mixed para-, meta- and, possibly, ortho-bonds. As starting substances for the preparation of the polyamines there may, instead of the isomeric xylylene diamines, preferably be used the xylylene diamines substituted by lower alkyl groups having 1 to 5 C-atoms. The polyamides formed possess alkyl-substituted cyclohexane rings in the chain instead of the unsubstituted rings in Formula II.

The modifying polyamine I or II or a mixture of these polyamines is added to the polyamide-forming starting substance in an amount from 0.17 to 10% by weight, calculated on the total amount of the starting substances, and the polycondensation is then started in exactly the same manner as when it were started without the modifiers, as is usual and known also in the manufacture of the corresponding unmodified polyamides. In this process, the usual additives such, for example, as matting agents (TiO₂ etc.) may, of course, be present or added in a later polycondensation stage. The polycondensation is generally started by heating at an elevated temperature, generally above 200° C., whereby the modifying polyamines are incorporated both into the polyamide chains and into the chain ends.

The modification of the polyamides with polyamine I and polyamine II and/or a mixture thereof may, although in a less advantageous manner, also be carried out by an after-treatment of the corresponding unmodified polyamides. To this effect the unmodified polyamides, most advantageously in the form of chips, are moistened, for example with a solution of the modifying polyamine in a solvent which does not affect the polyamide such, for example, as water, and the solvent is then removed so that the polyamine remains in a uniformly divided state on the polyamide chips. The polyamide chips treated in this manner are then subjected to a brief melting whereby practically the same modified polyamides are formed as in the case when modifiers are added to the polymerization batch. As brief melting procedure there suffices also melting for the purpose of extruding the polyamide melt or a simple extrusion. It is self-evident that the polyamide must not melt with decomposition in this treatment.

The polyamides modified according to the invention lend themselves with special advantage to the manufacture of filaments and fibers. Spinning of the modified polyamides is carried out in the same manner as the spinning of the unmodified polyamides, i.e. generally by melt spinning, in a few cases also by spinning the corresponding solutions. The polyamides modified according to the invention and the products made thereof possess an excellent degree of whiteness and have without exception a rather high molecular weight. The superiority of a polyamide that has been modified according to the invention over a polyamide modified in known manner (with diethylene triamine) is shown in the following table.

The difference in the degree of whiteness as well as in the molecular weight expressed by $\eta_{rel}$ (measured as a solution of 1% concentration by weight in sulfuric acid of 96% concentration by weight), with a sufficient number of equal amino groups, is shown in the table following hereunder:

TABLE

| Modification of polyamide 6 | Percent remission [1] | Content of NH₂ groups, m equiv./kg.[2] | Viscosity, $\eta_{rel}$. |
|---|---|---|---|
| Modified with 0.33% by weight of di-p-xylylenetriamine (hydrogenated in the nucleus) | 45.7 | 86 | 2.8 |
| Modified with 0.6% by weight of poly-4.4'-diaminodicyclohexylmethane | 43 | 82 | 2.5 |
| Modified with 0.3% by weight of diethylene triamine | 33.2 | 87 | 2.2 |
| Unmodified | 45.9 | 48 | 2.7 |

[1] Measured by means of the light-electrical remission photometer Elrepho of Messrs. Zeiss.
[2] Determined by potentiometric titration in a solution of m-cresol by means of 0.1 N methanolic para-toluene sulfonic acid.

The addition of diethylene triamine provokes a strong discoloration of the polyamide. The same effect has become known when carrying out the modification with polyethylene imine.

As compared with the aliphatic diamines such as hexamethylene diamine, the cycloaliphatic polyamines, when used as modifiers, have—in addition to bringing about a higher degree of whiteness—the advantage of yielding polyamides having a higher molecular weight with the same high content of amino groups due to the lower portion of primary amino groups.

The manufacture of polyamides having a higher molecular weight has gained increasing importance especially in the manufacture of fibers used for the production of carpets.

When high viscosities are to be attained with high percent additions of modifiers, suitable phosphorus compounds may be added to the polymerization mixture to carry out a secondary condensation such, for example, as phosphoric acid or the organic esters thereof, phosphonic acid and phosphinic acid or the organic esters thereof or phosphorous acid, in an amount not exceeding preferably 0.3% by weight, calculated on the total reaction mixture.

The following examples serve to illustrate the invention, but they are not intended to limit it thereto;

The content of amino groups in all tests described was determined by poentiometric titration in a solution of m-cresol with 0.1 N methanolic para-toluene sulfonic acid.

EXAMPLE 1

In an autoclave, 3 kg. of caprolactam were mixed, at 80° C. in an atmosphere of nitrogen with 200 ml. of water and 10 g. of di-para-xylylene-triamine which had been hydrogenated in the nucleus.

Then the mixture was heated to 180° C., and this temperature was maintained for one hour. The temperature was raised to 260° C., and the pressure of the autoclave was released at this temperature during the course of 1 hour. After normal pressure had been attained, polymerization was continued at 280° C. for a further 4 hours.

The polyamide melt obtained was discharged in the form of a tow by means of nitrogen pressure and granulated after having cooled in water.

To remove the residual monomer and the oligomers, the chips were washed three times at 80° C. in de-ionized water during the course of 2 hours, respectively, and then dried in vacuo at 90° C. during the course of 48 hours.

The polyamide obtained had a viscosity of $\eta_{rel}$ 2.8 in a solution of 1% concentration by weight in $H_2SO_4$ of 96% concentration by weight.

The content of amino groups was 86 m Equiv./kg.

EXAMPLE 2

As described in Example 1, 3 kg. of caprolactam were mixed with 200 ml. of water and 5 g. of di-para-xylylene triamine which had been hydrogenated in the nucleus, and the mixture was polymerized.

The viscosity of the product obtained was $$\eta_{rel}: 2.9$$

The content of amino groups was 62 m Equiv./kg.

EXAMPLE 3

As described in Example 1, 3 kg. of caprolactam were mixed with 200 ml. of water, 18 g. of di-para-xylylene-triamine which had been hydrogenated in the nucleus and 5 g. of $H_3PO_4$ (of 100% concentration by weight), and the mixture was polymerized. The viscosity of the product obtained was $$\eta_{rel}: 2.5.$$

The content of amino groups was 104 m Equiv./kg.

EXAMPLE 4

As described in Example 1, 3 kg. of caprolactam were mixed with 200 ml. of water, 40 g. of di-para-xylylene-triamine which had been hydrogenated in the nucleus and 8 g. of $H_3PO_4$ (of 100% concentration by weight), and the mixture was polymerized. The viscosity of the product obtained was $$\eta_{rel}: 2.2.$$

The content of amino groups was 150 m Equiv./kg.

EXAMPLE 5

7 g. of caprolactam, 3 g. of $\epsilon$-amino-caproic acid and 0.3% of poly-meta-para-xylylene-diamine, which had been hydrogenated in the nucleus, were mixed in a polymerization tube, and the mixture was polymerized in an atmosphere of nitrogen at 180° C. during the course of 2 hours and, following thereafter, at 270° C. for a further 6 hours. The polyamide obtained was granulated and washed and dried as described in Example 1.

The viscosity of the product obtained was $$\eta_{rel}: 2.7.$$

The content of amino groups was 85 m Equiv./kg.

EXAMPLE 6

10 g. of hexamethylene diammonium adipate were mixed with 0.4% of di-para-xylylene triamine which had been hydrogenated in the nucleus, and the mixture was heated in an atmosphere of nitrogen at 215° C. during the course of 2 hours. Following thereafter the mixture was heated at 270° C. during the course of 1 hour and subjected to a secondary condensation in vacuo for a further three hours at this temperature. Then the polyamide was granulated and washed, as described in Example 1.

The viscosity of the polycondensate obtained was $$\eta_{rel}: 2.6.$$

The content of amino groups was 81 m Equiv./kg.

EXAMPLE 7

1 kg. of chips of polyamide 6 were mixed with 650 ml. of water containing 4 g. of di-para-xylylene-triamine which had been hydrogenated in the nucleus and 4 g. of $H_3PO_4$ (of 100% concentration by weight). Then the water was evaporated in the rotary evaporator at 60° C. in vacuo and the chips were spun from the melt in known manner. The viscosity of the polyamide in the fibers obtained was $$\eta_{rel}: 2.6.$$

The content of amino groups was 80 m. Equiv./kg.

EXAMPLE 8

3 kg. of caprolactam were mixed, as described in Example 1, with 200 ml. of water and 10 g. of di-para-xylylene-triamine which had been hydrogenated in the nucleus, and the mixture was polymerized. As the polymerization proceeded and after a temperature of 180° C. had been attained, 0.1% of $TiO_2$ was metered into the autoclave in the form of an aqueous suspension. The distribution of the $TiO_2$ in the polymer corresponded to that in unmodified products.

This polyamide had a viscosity of $$\eta_{rel}: 2.8.$$

The content of amino groups was 85 m Equiv./kg.

EXAMPLE 9

7 g. of caprolactam, 3 g. of $\epsilon$-aminocaproic acid and 0.6% of poly-4,4'-diaminodicyclohexylmethane, with a content of scondary amino groups of 2.1 Equiv./kg., were polymerized as described in Example 5. The viscosity of the polyamide obtained was $$\epsilon\eta_{rel}: 2.5.$$

The content of amino groups was 82 m Equiv./kg.

We claim:

1. A saturated aliphatic fiber-forming polycarbonamide having incorporated therein from 0.17 to 10% by weight, calculated on the weight of the aliphatic polycarbonamide, of a polyamine modifying agent having the formula

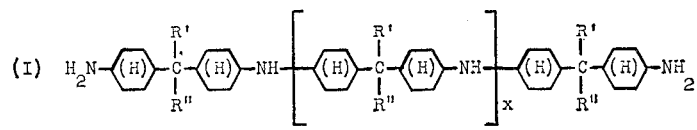

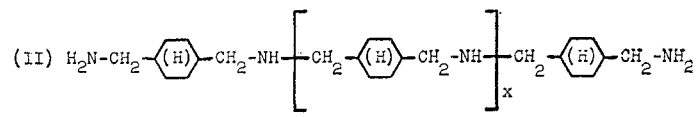

or a mixture thereof, wherein x represents an integer from zero to 10, R' represents —H, —CH$_3$, or —C$_2$H$_5$, R" represents —H, —CH$_3$ or —C$_2$H$_5$,

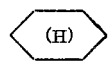

represents a completely hydrogenated benzene ring, and wherein the bonds of the rings in the polyamine of Formula II are meta- or para-bonds.

2. A saturated aliphatic fiber-forming polycarbonamide as defined in claim 1, wherein the polycarbonamide is a polycondensate of ε-caprolactam and ε-aminocaproic acid.

3. A saturated aliphatic fiber-forming polycarbonamide as defined in claim 1, wherein the polycarbonamide is a polycondensate of hexamethylene diammonium adipate.

4. A filament of the saturated aliphatic fiber-forming polycarbonamide defined in claim 1.

5. A filament of the saturated aliphatic fiber-forming polycarbonamide defined in claim 2.

6. A filament of the saturated aliphatic fiber-forming polycarbonamide defined in claim 3.

References Cited

UNITED STATES PATENTS

| 2,989,798 | 6/1961 | Bannerman | 260—78 |
| 3,036,047 | 5/1962 | Andres | 260—78 |
| 3,304,289 | 2/1967 | Ballentine et al. | 260—78 |
| 3,437,641 | 4/1969 | Lenz et al. | 260—78 |

HAROLD D. ANDERSON, Primary Examiner

U.S. Cl. X.R.

260—30.8 R, 78 A, 78 L